June 23, 1970     E. W. BERGERE     3,516,699

TAPER RIVET

Filed Feb. 28, 1969

INVENTOR.
EMRIC W. BERGERE

BY Fulwider, Patton, Rieber
Lee, and Utecht

ATTORNEYS

United States Patent Office 3,516,699
Patented June 23, 1970

1

3,516,699
TAPER RIVET
Emric W. Bergere, 2324 Nottingham Ave.,
Los Angeles, Calif. 90027
Continuation-in-part of application Ser. No. 587,898,
Oct. 19, 1966. This application Feb. 28, 1969, Ser.
No. 803,288
Int. Cl. F16b 5/04
U.S. Cl. 287—189.36                              6 Claims

ABSTRACT OF THE DISCLOSURE

A fastener for sheet metal comprising a headed rivet with a continuously tapered shank slightly larger than, and protruding through and beyond the hole into which it is driven, the rivet being hardened to near maximum shear strength and having a smooth-bored locking collar driven onto the projecting end of the shank, said collar being of a similar material and hardness to those of the shank and having a gross interference fit with the shank so as to lock it in place by a galling action between the collar bore and shank when the collar is driven home against the work face opposite the head.

REFERENCE TO RELATED APPLICATION

This is a continuation-in-part of my copending application Serial No. 587,898, filed Oct. 19, 1966, and now abandoned, entitled Taper Rivet.

BACKGROUND OF THE INVENTION

This invention relates to a fastener in the form of a tapered rivet for use in the assembly of the elements in the construction of aerospace and like structures requiring high lap shear strength and improved fatigue life when the fastener is installed in registering holes provided in the structure.

It is present riveting practice to install cylindrical fasteners in matching holes with a loose fit, the fasteners then being compressively set or expanded to fill said holes. While this method often fills the hole, the variations of maximum to minimum grip ranges prevent consistent tight rivets or the clamping of sheets to hold fuel and gas tight joints.

SUMMARY OF THE INVENTION

It is one object of this invention to provide a headed rivet with a tapered shank equivalent to that dimensioned in "Machinery Handbook" under the sections for Taper Pins and Taper Pin Reamers where the taper is standardized at ¼" per foot or .0208" per inch. While this taper pin has a force fit in the hole and provides the necessary bearing and shear stresses, it does not produce the required axial tensile force.

The tapered rivet of this invention is usually of fully hardened metal for maximum shear strength, larger than the receiving hole to produce an interference fit from a minimum of .003" to the highest allowance, depending on the structural metal used and the total joint thickness, and is driven or pressed into the joint by power applied to the head and reacted with a bucking bar engaging the opposite surface, said bar applying a collar in a force fit over the end of the rivet and against the structure to provide a tight, strong joint with no shear slippage but with a high clamping axial tensile load between the sheets. The strength, hardness and material of the collar are such as to produce a galling condition at the interface of the collar and the rivet that is believed to result in an intermolecular bond.

The invention elminates the need for using annealed rivets and driving a shop head which now can be underdriven or otherwise distorted to require drilling out such deformed bad rivets—an expensive procedure. When it is required, for repair, design change or many other reasons, to disassemble a joint using the rivets of this invention, a bucking bar is provided, so designed that the rivet is driven from the locking collar and the entire joint.

Other advantages and various characteristic features of the invention will become apparent from the detailed description and the drawings.

DETAILED DESCRIPTION

Figure 1:
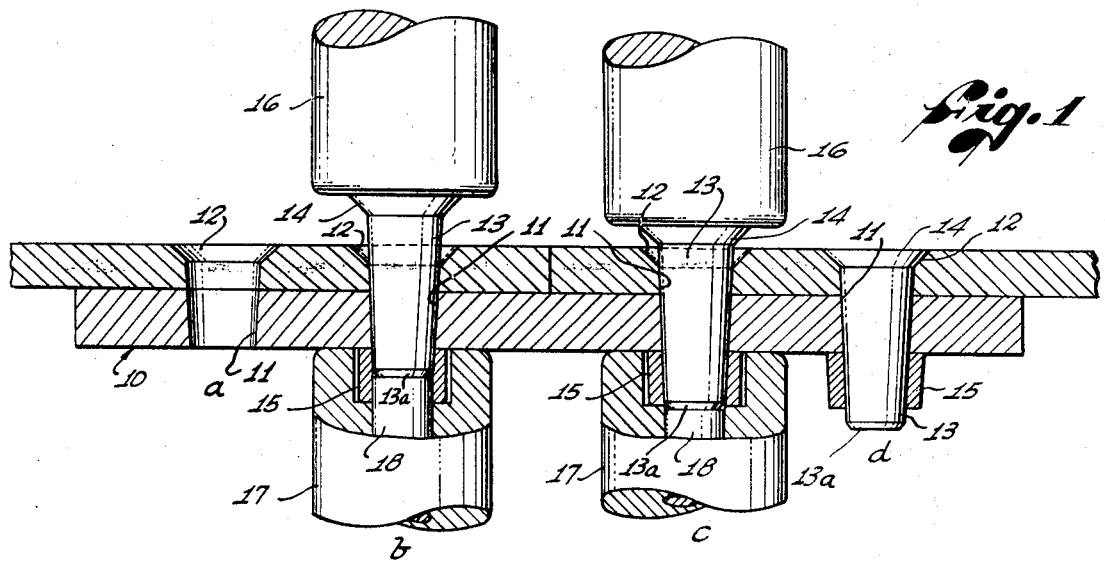
FIG. 1 is a cross-sectional view showing structural elements of a lap joint secured together in progressive stages in accordance with the present invention with the grip in the minimum condition.

In the drawings, like reference characters are applied to like parts throughout. Referring to FIG. 1, the sheet metal, lap joint structure 10 illustrates, in the portion designated *a*, a tapered hole 11 and a countersink 12 to accept, as shown in the portion designated *b*, a fastener shank 13 having a flush head 14. A continuously tapered rivet, like the taper pins used in machinery for a great many years, is driven by a bar 16 simultaneously into structure 10 and into a cylindrical collar 15 disposed against the underside of the structure 10.

The hole in the collar is not tapered and is sized for an extreme interference fit to cause locking of the collar and the rivet by a galling condition when the tapered shank 13 of the rivet penetrates the collar 15, as shown in the portion designated *c* in FIG. 1.

The completed joint is shown in the portion designated *d* in FIG. 1, with the structure 10 at a minimum grip, showing the head of the rivet 16 seated against one side of the joint, and a portion of the shank 13 extending past the collar 15. This portion is absorbed in a maximum grip condition. A chamfer 13*a* is applied to the free end of the shank to facilitate entry of the shank into the collar.

For a compressive fit of the rivet in the joint 10, the diameter of the shank 13 immediately adjacent the head is slightly larger than the hole through the joint, so that the material of the joint is stressed around the hole after the rivet is driven into the joint and through the collar 15.

To lock the collar onto the shank in a galled condition, the diameter of the shank immediately beneath the joint 10 is substantially greater than the diameter of the bore in the collar; in fact, the bore diameter is equal to or preferably slightly less than the diameter of the shank immediately above the chamfer 13*a* so that locking by galling occurs along the full length of the interface between the collar and the shank. The collar is of sufficient wall thickness to resist excessive outward yielding under hoop tension during assembly, and thus exerts the necessary inward force to produce galling as an incident to the driving of the parts together.

Figure 2:
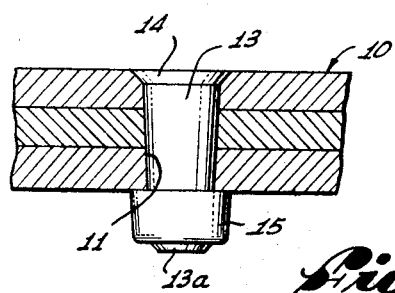
FIG. 2 is a sectional view of the fastener in the maximum grip condition in another lap joint.
Figure 3:
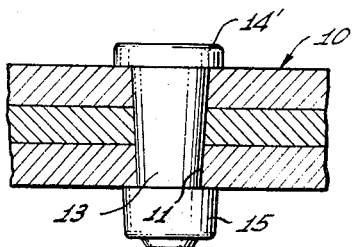
FIG. 3 is a view of the fastener similar to FIG. 2 but with a protruding head.

FIG. 2 shows the tapered rivet 13 set, with bucking bars 16 and 17, into structure 10 and collar 15, in maximum grip. FIG. 3 is identical to FIG. 2 except for the modified configuration of the head 14′.

Figure 4:
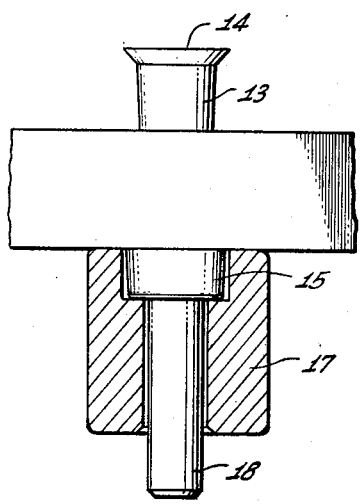
FIG. 4 is a view, partly in cross-section, illustrating a method of bucking the installed fastener for removal.

In FIG. 4, the fastener 13 is shown removed from the structure 10 by the use of a bucking bar 17 which contacts the structure face and indexes on collar 15. A center guide hole in the bar contains a pin 18 used to break the bond between the collar and the shank and drive the tapered rivet from the joint.

Figure 5:
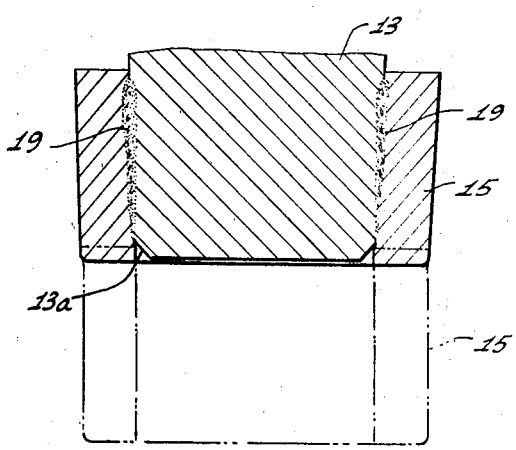
FIG. 5 is a greatly enlarged cross-sectional view through the fastener and the collar, during assembly of the collar on the rivet, illustrating the galling action and the intermolecular bond that is believed to form during assembly, the initial relative position of the collar being shown in broken lines with an intermediate relative position shown in full lines.

The manner of use of this fastener should be evident from the drawings and the foregoing description. The need for the combination of a high shear strength, tapered rivet which can also develop high tensile strength is satisfied by this invention. New aircraft, satellite and jet engine structures requiring strength and elevated temperature resistance, which cannot be obtained from metals in their annealed state, can now benefit by using this invention as the tapered rivet with the collar riveted joint is fabricated in the fully heat treated condition. For example, a hard titanium rivet and a matching titanium collar upon installation with 1500 lbs. pressure requires a suprisingly high removal force, a result of the interference fit and galling between the rivet and collar and the removal is accompanied by a tearing sound as the collar separates from the rivet. This may be explained by the physical metallurgy rule that similar metals in press fits will lock their face-grain surfaces. Thus, the riveting action in this invention relies upon the galling action to produce what is believed to be, in effect, a cold welding of the collar to the shank by intermolecular mixing of the surface metal of the two parts, as illustrated in exaggerated fashion at 19 in FIG. 5.

This invention is not to be limited by the embodiments shown in the drawings and described in the specification, which are given by way of example and not of limitation.

I claim as my invention:

1. In combination with a lap joint of given thickness with a hole therethrough, a fastener comprising, in combination:
    a metal rivet having a head on one end and a smooth, solid and continuously tapered shank substantially longer than the thickness of said joint and with its largest diameter adjacent said head, said rivet being disposed in said hole with the head seated against one side of said joint and with a portion of said shank projecting from the other side of said joint, said rivet being hardened to a hardness substantially greater than its annealed state whereby to maximize its shear strength and minimize permanent deformation of the metal during driving, and the diameter of the shank immediately adjacent the head being slightly larger than said hole whereby the material of said joint is stressed around said hole; and
    a locking collar driven onto said projecting shank portion and against the other side of said joint to lock the rivet in place, said collar having a substantially cylindrical and smooth bore which, when unstressed, is of substantially smaller diameter than said shank at a point adjacent said other side of said joint, and said collar being of a material and hardness similar to that of said shank whereby said collar is locked to said shank by a galling action between the bore and the shank when the collar is driven home against said other side of said joint.

2. The combination defined in claim 1 in which said bore diameter is no larger than the diameter of said shank at the small end of the taper thereof.

3. The combination defined in claim 1 in which said collar is sufficiently thick to resist outward deformation under the hoop stresses produced during driving of the collar onto said shank, thereby to produce said galling action.

4. In combination with a lap joint of given thickness with a hole therethrough, a fastener comprising, in combination:
    a metal rivet having a head on one end and a smooth shank projecting through and beyond said hole with said head seated against one side of said joint, the portion of said shank projecting beyond said hole being tapered and having its largest size adjacent said joint; and
    a collar having a generally cylindrical bore of preselected initial size disposed around said projecting portion and against the other side of said joint, said preselected initial size being substantially less than said largest size of said projecting portion, and said collar being composed of metal similar in strength and hardness to the metal of said shank and being driven onto said shank;
    and a galled, cold-welded metal bond at the interface between the collar and the shank locking said collar on said shank and against said other side.

5. The combination defined in claim 4 in which said rivet and said collar are of similar material and both hardened to substantially maximum tensile strength thereby to maximize said galling.

6. The combination defined in claim 4 in which said projecting portion of said shank is circular in cross-section and has a diameter adjacent its projecting end approximately the same as the diameter of said bore.

References Cited

UNITED STATES PATENTS

| | | |
|---|---|---|
| 430,318 | 6/1890 | Lendy. |
| 646,738 | 4/1900 | Ingalls. |
| 3,034,611 | 5/1962 | Zenzic. |
| 3,271,058 | 9/1966 | Anderson. |

FOREIGN PATENTS

| | | |
|---|---|---|
| 1,035,315 | 7/1966 | Great Britain. |

EDWARD C. ALLEN, Primary Examiner

U.S. Cl. X.R.

85—5, 37